Patented Nov. 28, 1922.

1,436,736

UNITED STATES PATENT OFFICE.

SYDNEY ROSSE TREVOR, OF SULPHUR BEACH, AUCKLAND, NEW ZEALAND.

MANUFACTURE OF PAINTS.

No Drawing. Application filed June 5, 1922. Serial No. 566,187.

*To all whom it may concern:*

Be it known that SYDNEY ROSSE TREVOR, a citizen of the Dominion of New Zealand, residing at Sulphur Beach, Auckland, in the Provincial District of Auckland, New Zealand, has invented certain new and useful Improvements in and Relating to the Manufacture of Paints, of which the following is a specification.

This invention relates to paints and to the manufacture of same, and its object is to provide a combination of ingredients, whereby there can be produced a composition which on being applied to and drying on a surface gives a coating of high finish, durability and protective quality, such composition being capable of being produced at a lower cost than the ordinary linseed oil products.

The ingredients combined to form the composition comprise rubber, oil, water with or without pigments.

The composition can be made to serve as a paint vehicle, pigment carrier or medium, or it can be produced in the form of a paint.

Virgin rubber, caoutchouc or india rubber may be used in the manufacture of the composition, but the use of vulcanized rubber known as scrap or waste rubber is preferred in order that the loading content thereof may be made use of.

The process of manufacture of a paint vehicle, pigment carrier or medium consists in dissolving rubber in linseed oil or in turpentine, kerosene, benzine, or other distillate suitable as a solvent, the rubber to be dissolved being equal to from 1% to 50% of the solvent.

Water equal to not more than 75% of the dissolved rubber and oil is then added to the mixture, and provides a composition capable of serving as a paint vehicle, pigment carrier, or extender, to which can be added the usual pigments, oils, driers and the like to form paints.

In manufacturing the above medium it is preferred to use vulcanized rubber, dissolved in the solvent as follows:

Approximately 25% of ground rubber and approximately 75% of the solvent are mixed together and heated to a temperature not lower than 140 degrees centigrade and not higher than 170 degrees centigrade, until the rubber is dissolved, when the temperature is raised to 200 degrees centigrade, and the liquid kept at the latter temperature until on a test being made a drop will rub out smooth and opaque on glass, with a tendency to become clear on drying.

This shows that the combination of the rubber and the oil is complete, whereupon the temperature is raised quickly to between 260 degrees centigrade and 310 degrees centigrade, the main object being to make the combination of rubber and oil permanent, although other desirable objects such as reducing the colour, and increasing the drying properties of the liquid are also attained, the lightening of the colour of the liquid showing that the necessary temperature has been reached, which temperature should be above 260 degrees centigrade and below 310 degrees centigrade, the actual temperature to use at this stage depending on the composition and the quality of the rubber used.

It is possible to dissolve rubber in oils at temperatures other than as above stated but the temperatures as indicated above give the best results.

The liquid is then strained while warm and on cooling, water sufficient to equal not more than 75% of the combined rubber oil and water is added to the dissolved rubber and oil, or a mixture containing 25% dissolved rubber and oil, and not more than 75% water is formed.

The combination of the water with the dissolved rubber and oil is effected by agitation and a test for perfect combination is made by rubbing out a small quantity of the mixture on clean glass. If not perfect, drops of water will show out which is an indication that the combination is not complete, and agitation should be continued until on a further test being made no water will show.

The quantities of rubber and water, used in the manufacture of the medium vary according to the quality of the rubber used, the quality of the medium required and the work for which the medium or the ultimate paint is intended, care being taken to keep within the ranges before set out.

For example, if the medium is required for indoor work it has been found that a composition containing rubber equal to $12\frac{1}{2}\%$ oil equal to $12\frac{1}{2}\%$ and water equal to 75% will dry and leave a waterproof and lasting surface, glossy and smooth while rubber and oil combined in the proportions of 25% and 75% respectively to which is added a quantity of water equal to from 30% to 40% of the combined rubber and oil, will provide a suitable composition for outside work.

To manufacture paints the usual pigments are broken down in oil or in medium of the required quality prepared as stated, using 15% less of the usual pigments than is ordinarily requisitioned, the combined pigments and oil or medium being thinned down to the required consistency with oil or medium.

In producing light colour paints for outside work it is preferred to employ 50% of pigment, 20% of oil, 12% of rubber and 18% of water, whereas in producing paints of dark colours, 33% of pigment, 20% of oil, 20% rubber and 27% water are employed.

Paints can be made by combining pigment and oil in the proportion of ⅓ of the former to ⅔ of the latter, and adding to the combined pigment and oil an equal quantity, by weight, of medium containing 12½% of oil and 75% of water.

Paints can be made by the direct combination of rubber and oil with pigments added, but the addition of water causes a more permanent combination, waterproofs the paint and increases the elasticity, gloss and durability.

What I do claim and desire to obtain by Letters Patent of the United States of America is:—

1. A composition for use in the production of paint, comprising 1 part rubber, 3 parts oil and 4 parts water, substantially as specified.

2. A composition for use in the production of paint comprising rubber dissolved in oil, less rubber than oil, being used, and water added to the liquid rubber and oil, substantially as specified.

3. A composition for use in the production of paint according to claim 2, wherein the rubber dissolved, is equal to from 1% to 50% of the oil, and wherein water equal to not more than 75% of the dissolved rubber and oil, is added to the latter, substantially as specified.

4. A method for the production of paint, comprising dissolving rubber in oil at a temperature between 140° centigrade and 170° centigrade and adding water to the dissolved rubber and oil, substantially as specified.

5. A method for use in the production of paint comprising dissolving rubber in oil at a temperature between 140° centigrade and 170° centigrade the rubber used being equal to from 1% to 50% of the oil; adding water equal to not more than 75% of the rubber and oil mixture when the latter has cooled, said mixture first having been raised to a temperature of 200° centigrade, and later to a temperature between 260° centigrade and 310° centigrade, substantially as specified.

6. A method for the production of paints comprising dissolving rubber in oil at a temperature not less than 140° centigrade and not more than 170° centigrade using rubber in amounts from 1% to 50% of the oil; mixing water equal to not more than 75% of the rubber and oil mixture into the latter by agitation, when said rubber and oil mixture has cooled, after having first been raised to a temperature not less than 260° centigrade, and not more than 310° centigrade, substantially as specified.

In testimony whereof I have affixed my signature in the presence of two witnesses.

SYDNEY ROSSE TREVOR

Witnesses:
  WILLIAM PINCHES,
  MARY PELKINGTON.